United States Patent [19]
Dowd

[11] 3,880,114
[45] Apr. 29, 1975

[54] CHAMFERING APPARATUS WITH COATING DEVICE

[75] Inventor: Daniel J. Dowd, Williamsport, Pa.

[73] Assignee: Westvaco Corporation, New York, N.Y.

[22] Filed: June 12, 1974

[21] Appl. No.: 478,565

Related U.S. Application Data

[62] Division of Ser. No. 375,655, July 2, 1973, Pat. No. 3,834,274.

[52] U.S. Cl. ................ 118/75; 90/11 R; 144/116
[51] Int. Cl. ............................................ B05b 11/00
[58] Field of Search .......... 144/114, 116, 117, 124, 144/134, 154, 253 D; 90/11 R, 18; 51/74 R, 80 A, 102, 208, 210; 118/75

[56] References Cited
UNITED STATES PATENTS

| | | | |
|---|---|---|---|
| 620,503 | 2/1899 | Romener et al. | 118/75 |
| 2,181,348 | 11/1939 | Sichere | 118/75 |
| 2,599,712 | 6/1952 | Izen | 144/154 |
| 3,065,492 | 11/1962 | Jackson | 118/75 |

*Primary Examiner*—Nile C. Byers, Jr
*Attorney, Agent, or Firm*—W. Allen Marcontell; Richard L. Schmalz

[57] ABSTRACT

Each one of a pair of pivot arms is pivoted at one end to a stationary support, the pivots being in vertically spaced relation. The free end of each arm carries a driven shaft journaled therein. The shafts are free floating and are disposed in vertically spaced relation with their axes in a common vertical plane. Each shaft carries a chamfering tool and a guide roller therefor arranged in close proximity. Biasing means yieldingly urges the free ends of the pivot arms towards each other so that their respective guide rollers and tools forcibly engage the top and bottom faces of a workpiece passed therebetween. The shafts are driven from a single motor common thereto, using pulley and elastic belt drive connections. A similar arrangement of pivot arms carries means for applying liquid stain to the surfaces chamfered by the tools.

7 Claims, 11 Drawing Figures

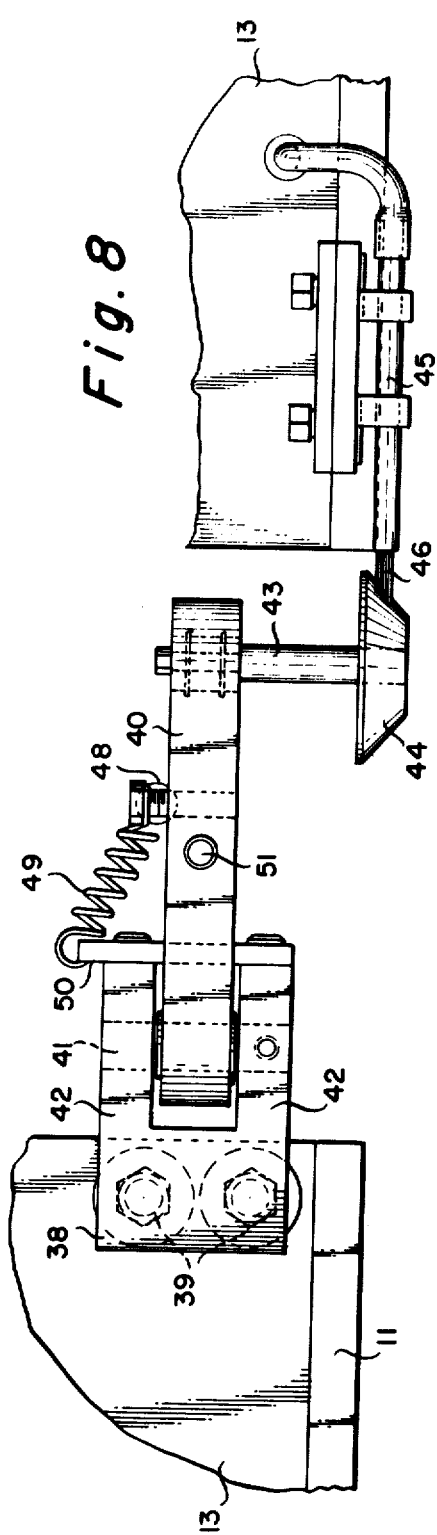
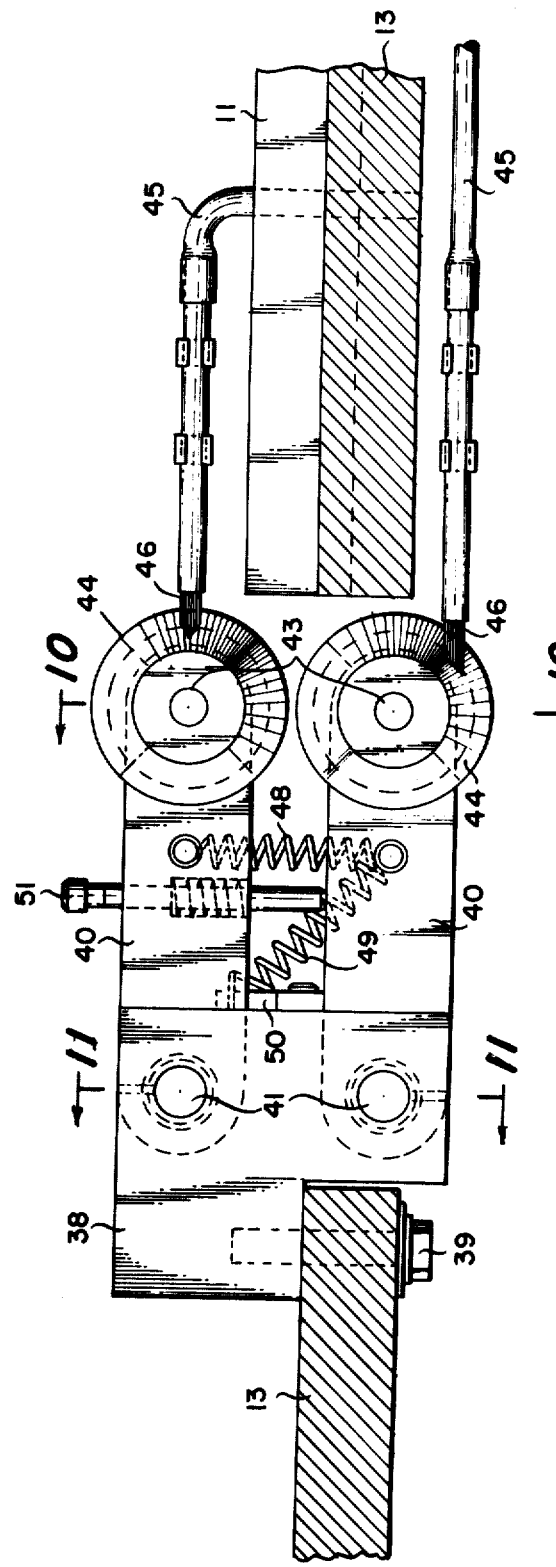

3,880,114

CHAMFERING APPARATUS WITH COATING DEVICE

CROSS REFERENCE TO RELATED APPLICATION

The present invention is a divisional from my application Ser. No. 375,655 filed July 2, 1973 and now issued as U.S. Pat. No. 3,834,274.

BACKGROUND

The field of the present invention is the art of apparatus for chamfering the edges of workpieces having parallel top and bottom faces of similar contour such as, for example, boards or plates of wood or other material fashioned to provide bookcase and library shelves, desk tops, table tops and the like.

The prior art concerned with such apparatus generally employs motor driven rotary cutting or grinding tool means engageable with either or both of the top and bottom face edges to be chamfered. The work is fed to the tool means between one or more pairs of guide rollers disposed before and behind the tool means in the line of travel of the work, with the axes of the rollers in parallel with the rotary axis of the tool means. Such arrangement has been found to have disadvantages. Because of the fact that the rollers engage the work at some distance from the point of contact between the work and the tool, and further because the faces of the work are not always fully planar, the edge of the work is chamfered unevenly and the resultant product is unsatisfactory.

The disadvantages of prior art chamfering apparatus are sought to be avoided by the apparatus disclosed in U.S. Pat. No. 3,191,500 to Schuster which, so far as applicant is aware, appears to be the closest prior art bearing on the present invention. In that apparatus a separate motor is provided for each tool, the tool is mounted on the drive shaft of its motor, there is a separate guide roller closely adjacent each tool, and the entire assembly of motor, tool, and guide roller is carried by a support member pivoted on a bearing that is fixed to a table having a flat top on which the workpiece is slidably fed into contact with the tool. Spring means biases the assembly support to pivot so that the tool is constantly in contact with the workpiece during its travel over the table top, and the workpiece first engages the guide roller before it comes in contact with the tool. The apparatus is necessarily complex and requires individual adjustments of a large number of parts, and the guide rollers are mounted and operate independently of the tools with which they are associated. Furthermore, the tool which chamfers the edge of the top face of a workpiece is offset in the direction of work travel from the tool which chamfers its bottom face edge; the tools are not in registry above and below the workpiece.

Laminates of plywood, plastics, and composition materials alone or in various strata combinations, generally veneered, have practically replaced solid wood in the manufacture of shelf boards and the like. Slight surface level irregularities are almost invariably present in such articles, so that their top and bottom faces are not fully planar. Boards and plates so made are rectangular in cross section, presenting sharp corners at the edges of their opposite faces. Where edge cosmetic effect is a prime consideration, such as in shelving, it is highly important that the depth of chamfer be as uniform as possible over the full length of a shelf. Perfection in this regard requires that a chamfering tool must accommodate itself automatically to slight surface irregularities of a shelf board or other workpiece at every point of contact of the tool against the work. In the case of shelf boarding and the like, the contact is a rolling line contact, which means that in any chamfering apparatus in which a guide roller engages a work surface on a line of contact that is offset (in the direction of work travel) from the line of contact between the tool and the work, the respective lines of contact will be in parallel, laterally spaced relation; and even though the spacing be slight, as in the aforesaid U.S. Pat. No. 3,191,500, it is possible that a surface irregularity might be present in the spacing area and thus impair the accuracy of the tool in regard to depth of chamfer at the precise point of engagement of the tool with the surface irregularity. Otherwise stated: The teaching of the prior art concerned with chamfering apparatus is that a guide roller, even though very close to its associated tool, always first engages a work surface at a point of contact that is at a greater radial distance from the axis of the tool than is the point of contact between the tool and the work.

SUMMARY OF THE INVENTION

The basic invention intrinsic in the specific embodiment here disclosed is the provision, in a chamfering apparatus, of a floating driven shaft carrying both a rotary chamfering tool and a work surface-engageable guide roller therefor. The tool and the roller are in close proximity and their relative diameters such that both engage a workpiece initially at axially spaced contact points which lie in a plane common thereto and which passes through the axis of the shaft. The character of the initial engagement is maintained constant from start to finish of the chamfering operation. Due to this arrangement, it is not possible for either the tool or the guide roller to shift relative to the other radially or axially of the shaft; all three elements, the shaft, the tool, and the guide roller must move in unison and to the same extent either up or down relative to a workpiece undergoing a chamfering operation. Biasing means maintains the guide roller and the tool in constant contact with the work, and, because the shaft on which they are mounted is a floating shaft, the roller and tool conform automatically to any variations in the work surface they engage, thus assuring a uniform depth of chamfer throughout the operation, regardless of surface irregularity of the work.

In the preferred embodiment of the invention here disclosed, the above described organization of elements is duplicated and arranged for operation on the opposite face of the work, so that both the top and bottom face edges may be chamfered simultaneously.

Additionally, the present invention combines with its chamfering apparatus means for applying a liquid stain material to the chamferred surfaces during the chamfering operation, which means functions in such close proximity to the chamfering tool that for all practical purposes it is a part of the chamfering apparatus, it being a means providing the finishing step necessary to production of a commercially satisfactory product.

DESCRIPTION OF THE DRAWINGS

FIG. 8 is a top plan view of the stainer assembly.
FIG. 9 is a front elevation of the stainer assembly.

DETAILED DESCRIPTION

Figure 1:
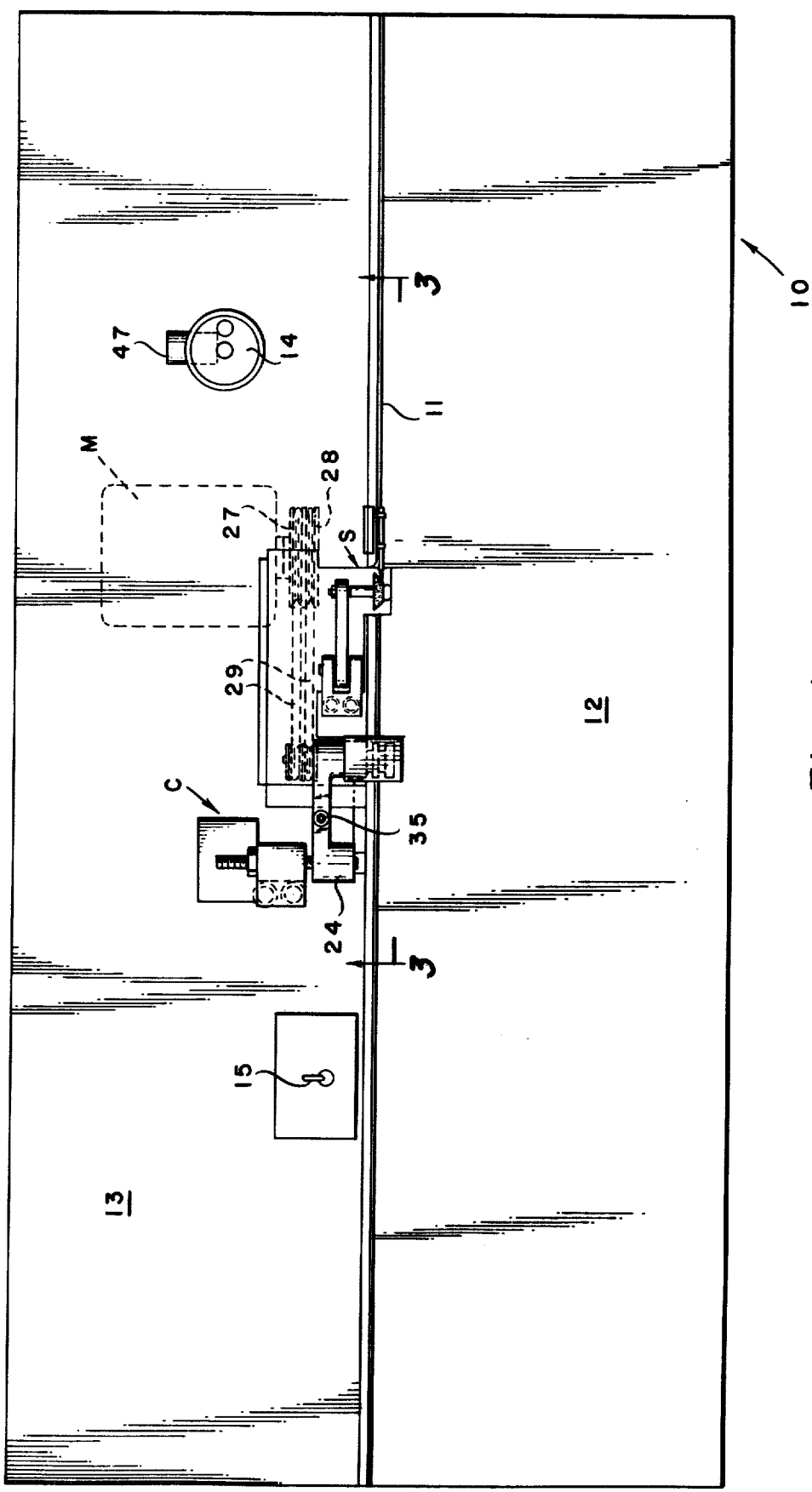
FIG. 1 is a top plan view of the apparatus comprising the present invention.

The preferred embodiment of the invention comprises a rectangular base table 10 having a horizontal flat top which is divided by a longitudinal rail 11 into a workpiece section 12 and an instrument support section 13. The instrument section mounts a chamfering assembly C and a stainer assembly S, a reservoir 14 for liquid stain, a drive motor M, and a motor control switch 15. With respect to FIG. 1, the direction of work travel is from left to right, so that the chamfering assembly C is in advance of the stainer assembly S. The two assemblies are separate but closely associated. The mechanism of the chamfering assembly is operated by the motor M; the stainer assembly has no connection with the motor.

The Chamfering Assembly

Figure 7:
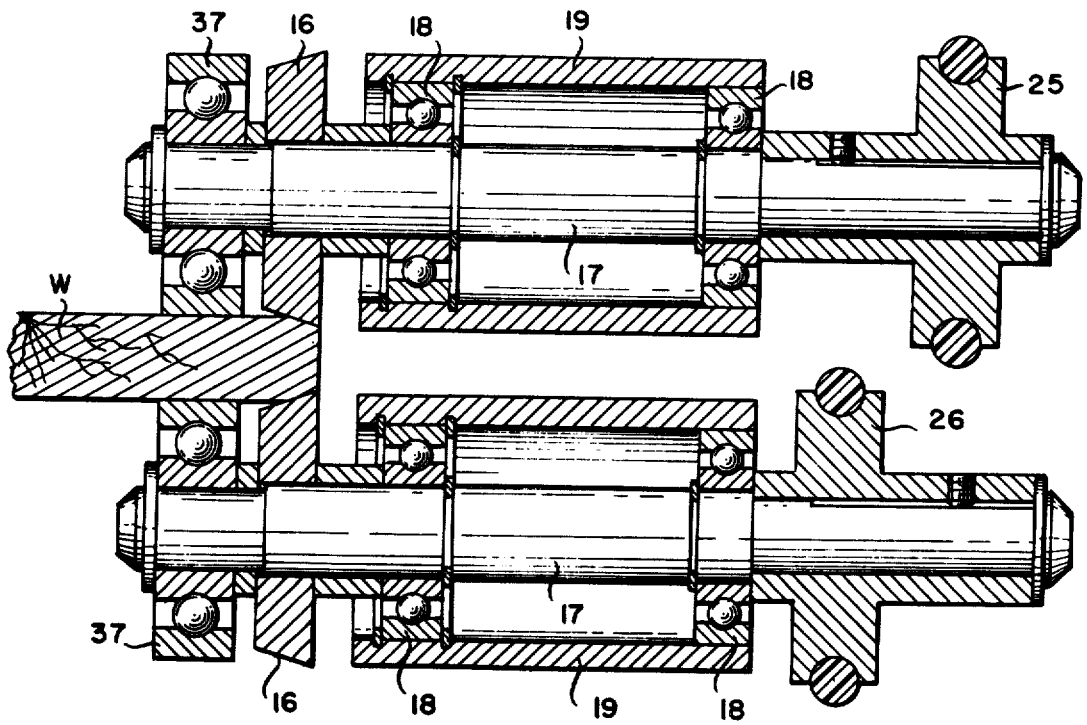
FIG. 7 is a section on line 7—7 of FIG. 5.
Figure 10:
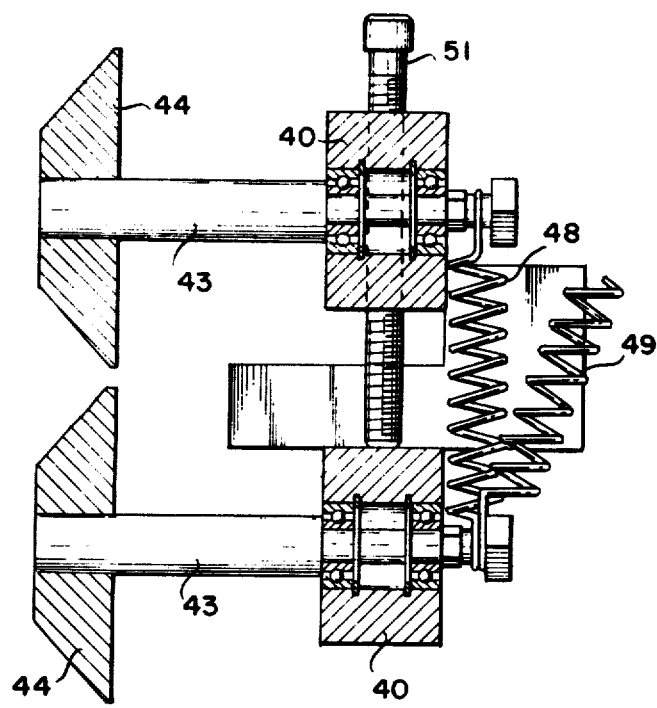
FIG. 10 is a section on line 10—10 of FIG. 9.

Details of the chamfering assembly are best illustrated in FIGS. 4–7. The structure includes a pair of vertically aligned rotary cutter or grinding tools 16 which, as shown in FIG. 7, are positioned to engage, respectively, the top and bottom faces of the edge of a workpiece W to be chamfered. Each tool is fixed to an individual driven shaft 17 for rotation therewith. The shaft is mounted by means of ball bearing assemblies 18 in a lateral extension 19 of the trailing end of a pivot arm 20 which is pivoted at its leading end on a fixed shaft 21 carried by a mounting block 22 that is fixed to the instrument section 13 of the table top by appropriate fastener elements 23. One end of shaft 21 projects laterally from the block 22 and constitutes a pivot for a lateral extension 24 of the leading end of pivot arm 20. Both extensions of the pivot arm are in parallel spaced relation, but the leading end extension 24 is of lesser axial extent than the trailing end extension 19 and is disposed wholly within the area of the table top instrument section 13. The tool carrying shafts 17 of their respective pivot arm end sections 19 are disposed one above and the other below the horizontal plane of the top face of the table top and in parallel spaced relation, with their axes in a common vertical plane perpendicular to the plane of the table top and transversely across the workpiece guide rail 11.

On the instrument section 13 side of the guide rail each shaft 17 has fixed thereon a belt drive pulley. As best shown in FIG. 7, the pulley 25 of the upper shaft is offset with respect to the pulley 26 on the lower shaft. The drive shaft of motor M has fixed thereon a belt drive pulley 27 in alignment with the upper shaft pulley 25, and a belt drive pulley 28 in alignment with the lower shaft pulley 26. The respective aligned pairs of pulleys are operatively connected by drive belts 29 (see FIG. 1). These belts are round elastic endless belts, preferably endless woven elastic belts.

Figure 2:
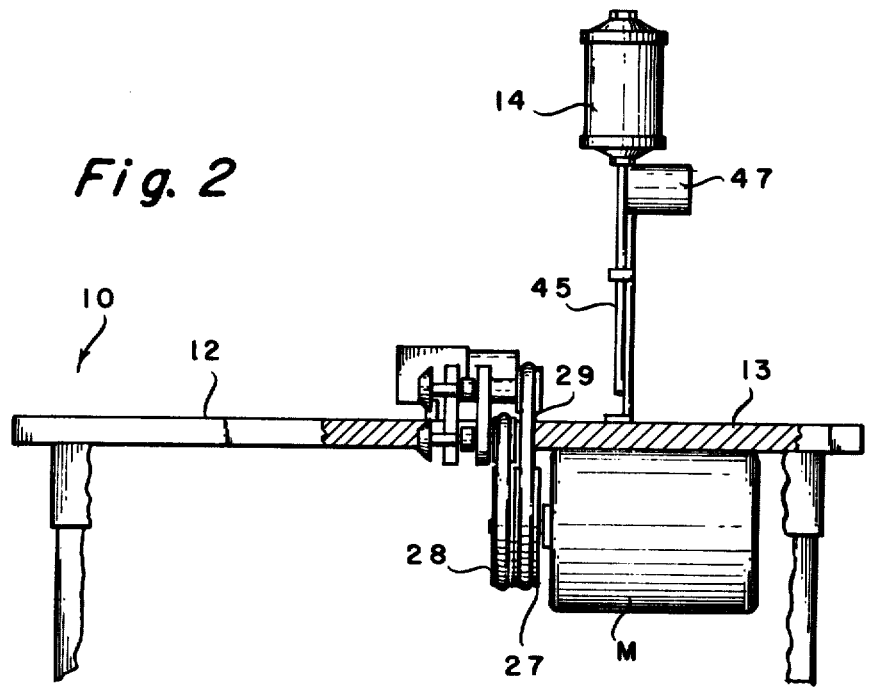
FIG. 2 is an end view from the right of FIG. 1.
Figure 3:
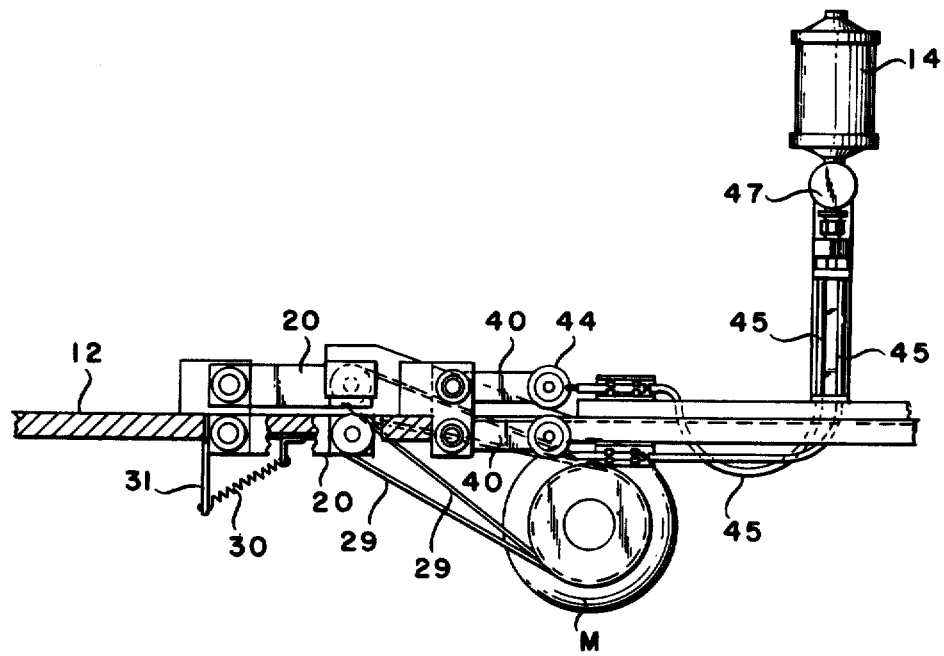
FIG. 3 is a sectional view on line 3—3 of FIG. 1.
Figure 5:
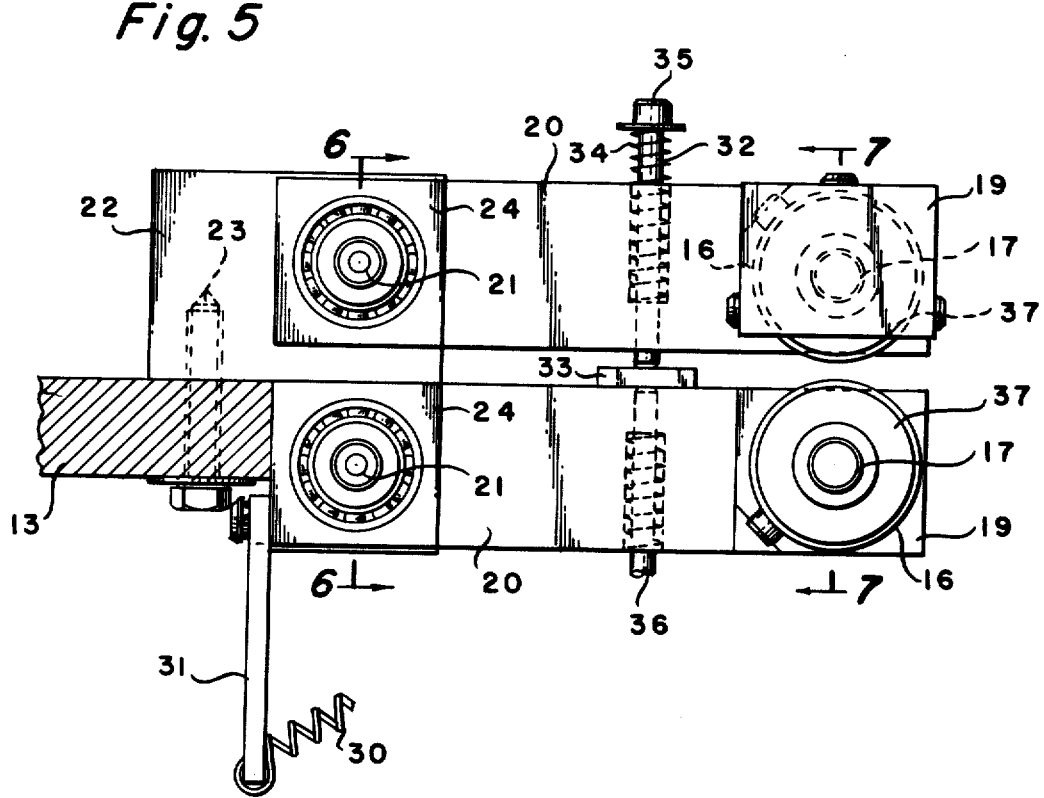
FIG. 5 is a front elevation of the chamfering assembly.
Figure 6:
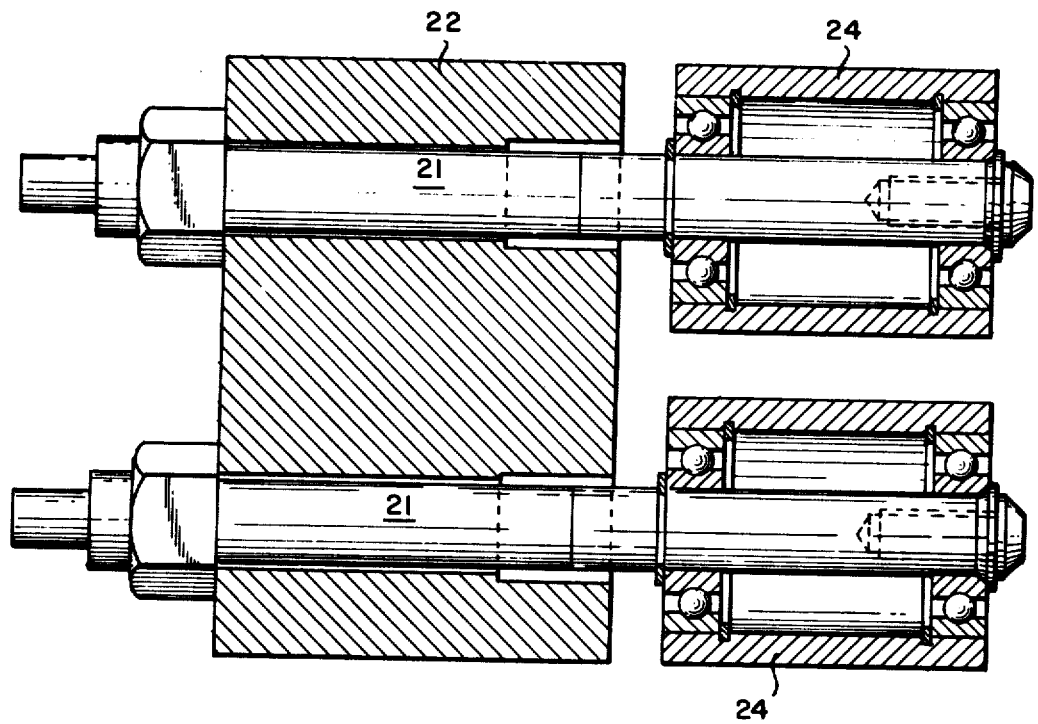
FIG. 6 is a section on line 6—6 of FIG. 5.

A salient feature of the present invention is the relative locations of the belt pulleys in combination with elasticity of the belts. It is apparent in FIGS. 1 and 2 that the drive motor is so positioned that its driving pulleys 27 and 28 are appreciably below the tool shaft pulleys 25 and 26 and well to the rear thereof in regard to the direction of travel of the work. Due to this arrangement, the tension of the elastic belts exerts a downward pull on the upper and lower pivot arm trailing ends, thereby tending to pull the upper tool 16 forcibly into a floating engagement with a workpiece passing thereunder, at the same time exerting a weaker pull on the lower pivot arm tending to move its tool 16 downwardly and out of contact with the workpiece. At this point it should be explained that the respective pivot arms and belts have vertical play in and through an appropriate aperture in the table top. The downward pull of the belt connecting the driving pulley 27 with the upper driven pulley 25 is amply sufficient at all times to maintain the upper tool 16 in full contact with the upper workpiece surface without the aid of other biasing means. In order to counteract the down pull of the belt connecting the lower drive pulley 28 and the lower driven pulley 26 a coil contraction spring 30 is connected at one end to a fixed point of anchorage on the bottom face of the table and at its other end to the lower terminal of a vertical post 31 that is secured to and depends from the forward end of the lower pivot arm 20, as shown in FIG. 5. The tension of the spring 30 and the leverage of the post 31 combine to exert a force sufficient to overcome the downward pull of the driving belt and to bias the lower pivot arm so that it pivots on its shaft 21 and moves in a counterclockwise arc to maintain its associated tool 16 in contact with the workpiece.

Cooperatively, the above described cutter drive train capitalizes upon the extensible property of the resilient drive belts 29 to simultaneously free the total design from at least two, normally accepted, design restraints, e.g. rigidity in the distance between driving members (pulleys 27 and 28) and driven members (pulleys 25 and 26); or, the counterbalancing problems associated with the large, movable mass of individual, direct drive motors for each cutter. Since the axes of driven pulleys 25 and 26 change in radial separation distance from the axis of driving pulleys 27 and 28 for each angular position of pivot arms 20, it necessarily follows from the described arrangement that the length of drive belts 29 must accommodate the change in axial separation distances. However, most of such distance change occurs to the upper pivot arm assembly since the plane of table surface 12 limits the necessity for much angular variation in the lower pivot arm assembly unless the lower surface of the workpiece makes a substantial departure from the table surface 12. Accordingly, by the preferred arrangement, as the free end of the upper pivot arm assembly swings away from the surface 12, the respective driving and driven pulley axis separation distance increases to increase the bias on the upper cutter 16 into the workpiece.

An obvious alternative power transmission arrangement to accomplish the same purpose would be to dispose the driving pulley axis between the axis of the arm 20, pivot shaft 21 and the cutter shaft 17.

Figure 4:
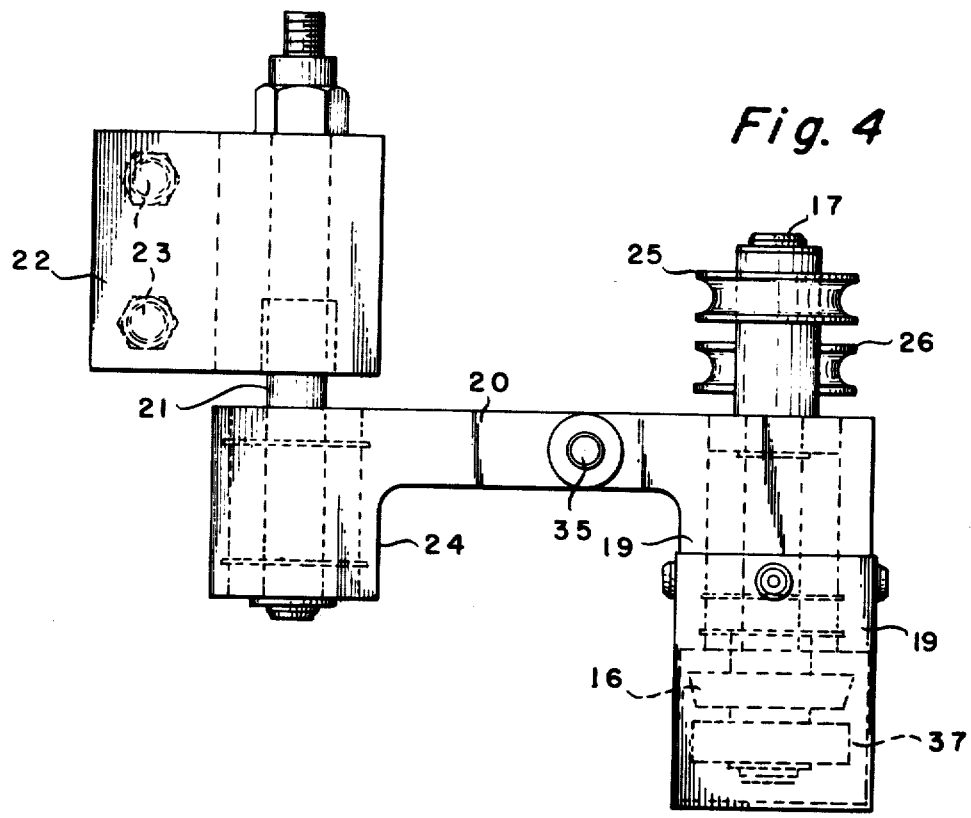
FIG. 4 is a top plan view of the chamfering assembly.

FIGS. 4 and 5 also illustrate details of means by which the vertical spacing between the upper and lower pivot arms may be adjusted to a near proximity of the workpiece thickness. This means comprises an upper bolt 32 threaded in and through the upper pivot arm 20 with its lower end bearing on a spacer block 33 that is fixed to the table top and which projects between the pivot arms substantially in the plane of the top face of the table. An expansion spring 34 surrounds the bolt stem between its head 35 and the bottom of a receiving socket in the body of the pivot arm. The spring provides a tension which serves to hold the bolt in any selected position of adjustment to which it is moved. In like manner, the lower pivot arm carries a bolt 36 identical to the upper bolt 32 except that it is reversed.

A collateral function of the bolts 32 and 36 is to provide an absolute positional limit for the respective pivot arms 20. Without the abutment relation between the spacer block 33 and the bolts 32 and 36, the resilient bias of the upper pivot arm drive belt 29 and the spring 30 would urge the two pivot arms 20 together, thereby causing interference or clashing of the upper cutter 16 with the lower cutter 16.

As best shown in FIG. 7, each tool shaft 17 mounts on its outer end a ball bearing guide roller 37 spaced axially from its adjacent tool 16 but in very close relation thereto, so that the guide rollers bear upon the top and bottom faces of a workpiece being chamfered by the tools 16. The rollers engage the top and bottom faces of the workpiece only slightly inwardly from its edge and in exact axial alignment with their respective tools and provide positive spacial separation between the workpiece surface and axis of shaft 17.

Functionally, guide rollers 37 determine the depth to which the cutters 16 penetrate below the workpiece surface. Since the axial (relative to shaft 17) relationship between the cutters 16 and the workpiece is determined by the rail 11, the cut depth is the only variable affecting chamfer face width. Accordingly, if a wider chamfer face is desired to be cut with the same tool 16, a deeper cut, relative to the respective workpiece surface, is required. To effect the deeper cut, a smaller diameter guide roller 37 is required.

Should it be desirable to adjust the cutting depth more conveniently than by changing guide rollers 37, obviously other, adjustable spacing devices may be employed in lieu of the rollers 37 such as an extensible shoe fixed to the shafts 17.

The Stainer Assembly

Figure 11:
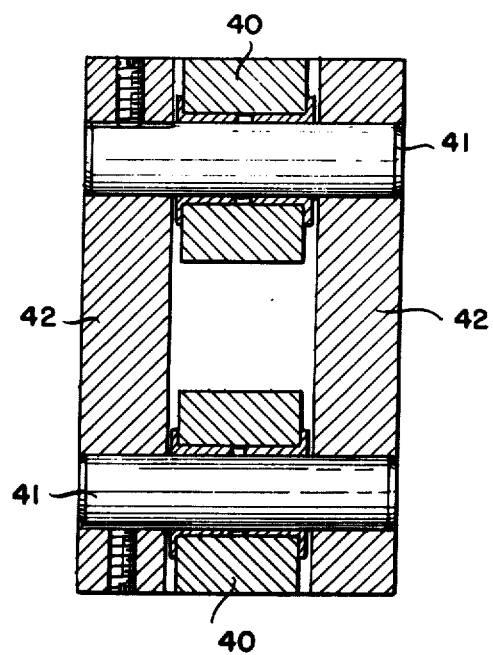
FIG. 11 is a section on line 11—11 of FIG. 9.

Details of the stainer assembly S are illustrated in FIGS. 3 and 8–11. From FIG. 1 it will be seen that the stainer assembly is closely adjacent and slightly behind the chamfering assembly C and in alignment therewith longitudinally of the table. A support block 38 attached to the table section 13 by fastener elements 39 provides a pivotal mount for upper and lower pivot arms 40. The leading end of each arm is pivoted on an individual shaft 41 carried by the support block 38 and extending transversely between parallel, laterally spaced arms 42 thereof as shown in FIG. 11. Each pivot arm 40 carries at its trailing end a freely rotatable individual shaft 43 that extends transversely across the workpiece guide rail 11 on an axis parallel to the axes of the pivot shafts 41 and the tool shafts 17 of the chamfering assembly. The outer end of each shaft 43 has fixed thereon a beveled, stain applying roller 44 that is in longitudinal alignment with its corresponding tool 16 of the chamfering assembly. Liquid stain is fed from the reservoir 14 through conduits 45 which terminate at their discharge ends in wicks 46 that are in contact with the work engaging bevel faces of the stain applying rollers 44. Control valve means 47 governs feed of the liquid stain to the applicator wicks 46.

The pivot arms 40 are connected by a contraction spring 48 which biases the trailing ends of the arms to move toward each other and thereby force their stain applying rollers 44 into a floating engagement with the top and bottom faces of a workpiece passing therebetween. A second contraction spring 49 connected at one end to the lower pivot arm 40 and at its other end to an element 50 of the support block 38 exerts an upward pull on the lower pivot arm which biases the lower stain applying roller 46 upwardly into contact with the upper stain applying roller. The two rollers are, however, maintained in selectively adjustable spaced relation by means of a bolt 51 identical to the spacer adjustment bolt 32 in the chamfering section in location and arrangement. The lower end of the bolt 51 bears on the upper face of the lower pivot arm 40 and thus maintains the rollers 46 in a selected vertically spaced relation against the bias of the spring 48. When a workpiece passes between the rollers, it forces them apart against the bias of the spring 48 so that both rollers are maintained in forcible face contact with the top and bottom chamfered surfaces of the workpiece.

Mode of Operation

A shelf board or other workpiece to be chamfered is placed flatly on the work support section 12 of the table with the side edge face that is to be chamfered in full face contact with its guide rail 11 and is moved from left to right to bring its leading end into the chamfering section C and between rotary tools 16 and guide rollers 37. Although the workpiece is first engaged by the cutter 16, full cutting depth is not reached until the guide rollers 37 engage the workpiece. If the static separation between the guide rollers 37 is properly set by bolts 32 and 36 to a distance slightly less than the workpiece thickness, the workpiece leading edge engages the roller peripheries at a low relative angle thereby forcing the entire trailing end 19 assemblies of pivot arms 20 respectively apart against the bias of spring 30 and resilient drive belt 29. In this working position, the cutters are held in fixed relation to the respective workpiece surfaces. The spring 30 and drive belt 29 constantly urge the cutters into the workpiece but guide rollers 37 limit the depth of penetration. Therefore, regardless of undulations in the workpiece surface relative to the plane of support section 12, the cutters 37 are free to float as is necessary to sustain a fixed cutting depth relative to the workpiece faces.

In the preferred embodiment of the invention, the workpiece is moved manually from left to right through the chamfering section and then through the stainer section, but other means could be employed to move the work on its table top support section 12.

As soon as the leading end of a workpiece passes beyond the chamfering station, it passes between the upper and lower stain applying rollers 44. These rollers also have floating engagement with the workpiece, but only over the chamfered areas. Their spring bias arrangement, which is generally similar to that of the chamfering section pivot arms, maintains the rollers in full contact with the workpiece and, because of their close proximity to the tool guide rollers of the chamfering section, they function as holding means which keeps the workpiece flat on the table top while it is undergoing chamfering. In use, it is found that the frictional engagement between the stain applying rollers and the chamfered surfaces of the work is sufficient to ensure free rotation of the rollers. It is, however, within the purview of the invention that they could be fixed on their shafts for rotation therewith, and that the shafts could be driven from the motor M if desired.

I claim:

1. Chamfering apparatus comprising, in combination:
   A. Table structure having a planar top surface for supporting workpieces having top and bottom planar faces;
   B. A workpiece guide rail dividing said top surface into an instrument section and a workpiece support section;
   C. First and second arms pivotally connected at one end thereof to said table structure on the instrument section side of said guide rail about horizontal pivot axes, said first and second arm pivotal connections spaced along said guide rail with axes thereof disposed substantially perpendicular to said guide rail;
   D. A shaft rotatably journaled in the other end of said arms to axially extend across said guide rail substantially parallel to said pivot axes, said shaft having a tool end over said workpiece section, the shaft of said first arm disposed along said guide rail between said first and second arm pivotal connections;
   E. Said first arm shaft also having a sheave end disposed over said instrument section and workpiece engaging means secured to the tool end thereof to limit the distance at which said shaft may approach a workpiece face;
   F. A rotary chamfering tool also secured to the tool end of said first arm shaft;
   G. A rotary stain application tool secured to the tool end of said second arm shaft;
   H. A rotational power source secured to said table structure below said top surface; and
   I. A resiliently extensible driving connection between said power source and the sheave end of said first arm shaft.

2. Chamfering apparatus as described by claim 1 further comprising:
   Third and fourth arms pivotally secured to said table structure below and substantially parallel to said first and second arm pivotal connections, respectively, said third and fourth arms having rotatable shafts and tools disposed substantially parallel with said first and second arms, shafts and tools respectively.

3. Chamfering apparatus as described by claim 2 wherein said third and fourth arms are biased toward said first and second arms, respectively, by resilient connections to said table structure and said first and second arms are biased toward said third and fourth arms, respectively, by resilient connections therebetween.

4. Chamfering apparatus as described by claim 3 wherein adjustable abutment structure is provided on said first and third arms to cooperate with an abutment portion of said table structure to limit relative proximity between said first and third arms and said table structure.

5. Chamfering apparatus as described by claim 3 wherein adjustable abutment structure secured to one of said third and fourth arms and cooperative with the other of said third and fourth arms is provided to limit the relative proximity therebetween.

6. Chamfering apparatus as described by claim 1 wherein the positional relation between said first arm shaft sheave end and said power source is such that the extensible driving connection therebetween is to bias said first arm toward said second arm.

7. Chamfering apparatus as described by claim 2 further comprising a stain solution reservoir secured to said table structure, a stain solution feed conduit from said reservoir to each of said second and fourth arm stain applicator tools, and a wick in the delivery end of said conduits in continuous contact with respective stain applicator tools to conduct a liquid stain solution from said conduits to the surface of said applicator tools.

* * * * *